J. C. GARNER.
FIBER SEPARATING DEVICE.
APPLICATION FILED FEB. 3, 1920. RENEWED JAN. 18, 1922.
1,414,509.
Patented May 2, 1922.
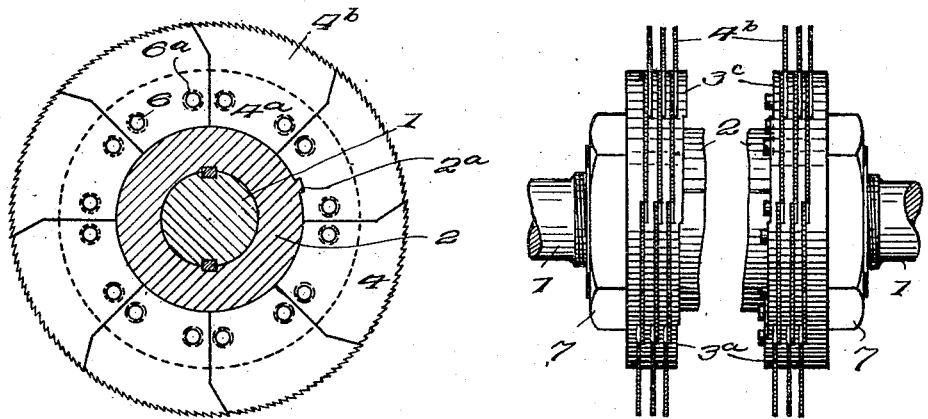
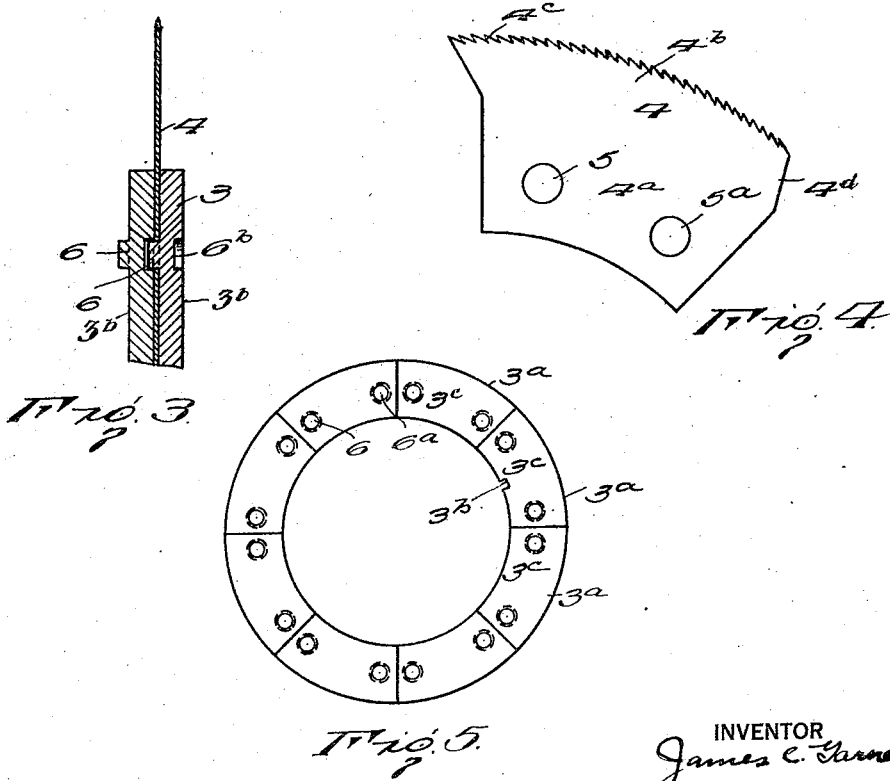
INVENTOR
James C. Garner
BY
H. H. Bliss
ATTORNEY

UNITED STATES PATENT OFFICE.

JAMES C. GARNER, OF HOUSTON, TEXAS, ASSIGNOR, BY MESNE ASSIGNMENTS, TO THE GARNER GIN COMPANY, INC., OF HOUSTON, TEXAS, A CORPORATION OF TEXAS.

FIBER-SEPARATING DEVICE.

1,414,509.  Specification of Letters Patent.  Patented May 2, 1922.

Application filed February 3, 1920, Serial No. 355,935. Renewed January 18, 1922. Serial No. 530,231.

*To all whom it may concern:*

Be it known that I, JAMES C. GARNER, a citizen of the United States, residing at Houston, in the county of Harris and State of Texas, have invented certain new and useful Improvements in Fiber-Separating Devices, of which the following is a specification, reference being had therein to the accompanying drawing.

This invention relates to improvements in the mechanism used for disintegrating masses of cotton fiber, and separating, to as great an extent as possible each fiber from its neighbors to permit the escape of foreign particles and for thoroughly intermingling the fibers of varying colors to improve the grade of the material.

Cotton masses requiring such treatment are met with in large quantities, and the present device is intended to purify and raise the grade of the cotton fiber in such masses.

I have heretofore designed fiber-separating mechanisms of several sorts these including rotary toothed drums comprising holding or carrying devices and a large number of separately attachable and separately removable saw sections. The present invention relates to an improved form of fiber separating drum of this class.

In the drawings:

Fig. 1 is a side elevation of one of the series of saw sections, the shaft and hub being shown in cross section.

Fig. 2 is a side view of the two end parts of the saw cylinder with the elements assembled.

Fig. 3 is a detailed view of two adjacent locking collars and the saw segment held between them.

Fig. 4 is a view of one of the saw sections.

Fig. 5 is a side view of one of the locking collars.

The component elements of the saw cylinder are mounted on the shaft 1 to which is keyed a sleeve hub 2. On this hub are fitted the ring-like spacers or hub collars 3. Each of these is composed of a plurality, here eight, of integral sections $3^a$, each section being offset axially in relation to the adjacent sections, so that the radial faces (right and left) of each section will, correspondingly, lie in radial planes other than the planes of the faces of the adjacent sections. Each of the rings or spacing collars has a large central aperture and is adapted to be fitted to the sleeve 2. The latter is locked against rotation relative to the collars or spacers by the key $2^a$ in the key-ways $3^b$.

4, 4 indicate sectional saw blades. Each is formed with a main radially positioned web or blade part $4^a$, $4^b$. The part $4^a$ is fitted to one of the radial recesses $3^c$ of a spacer or ring section 3. The part $4^b$ extends outward beyond the periphery of the collar 3. Each saw section has a peripheral projection at $4^c$ and at the opposite edge is cut away somewhat as at $4^d$. Each of the saw blades or webs has one or more apertures, 5 and $5^a$, and each spacer or collar has pins 6 and $6^a$, each adapted to pass through such an aperture. And in the face of each collar 3 opposite to that which carries the pins 6, $6^a$, there are sockets $6^b$ of such dimensions that the pins on an adjacent collar can fit snugly therein when saw sections are placed between the two collars.

These pins 6, $6^a$ firmly and securely hold the individual saw sections in position and prevent them from being thrown outward by centrifugal force during the rapid rotation of the saw cylinder. All of the component parts of the cylinder are firmly bound together by nuts 7 which engage with threads on the shaft.

As stated I have made saw drums each of which had a rotary carrier element or holder comprising an axially elongated radially expanded hub with polygonal (hexagonal) periphery, and a plurality of saw sections. Each of these saw sections had a straight inner edge fitted transversely to one face of the periphery of the carrier, and was held in place by a horizontally turned flange formed at the inner edge of its radial element or web, which flange was clamped down by a spacing collar or hub ring having a polygonal aperture. In many cases I have found that it is better to avoid the forming of the bent flanges on the thin sheet steel and to secure the sections to the holder by means of fasteners which engage with the radial web or plate part of the toothed section at points radially farther from the axis than the inner edge of the saw part. In the present mechanism the horizontally disposed projecting pins fitted in the apertures in the saw sections constitute such a holder. The apertures and the pins are far enough from the inner edges of the sections to insure that there shall be around them sufficient of the sheet metal to avoid tearing or breaking of the web part when under high velocity.

Again, in the present mechanism, the part 2 of the carrier to which the sections are fitted is cylindrical and not polygonal, and I am able to manufacture this core element of the mechanism much more accurately and cheaply than is the case when the carrier or drum is non-cylindrical. These drums rotate at a very high speed and must have all of the parts around their axis in accurate and delicate balance. The core part is extended radially so as to reduce the area of saw disk metal required, largely reducing the expense. And as this core element is cylindrical, it can be machined and manipulated in the shop in such way as to readily ascertain and maintain the balance required during rotation.

These core elements 2 of the carrier may be made of hardwood or of metal. They can be made of seamless tubing, the tubular part being connected with a shaft by suitable hubs or spiders and the periphery of the tube having one or more splines or keys attached for engaging with the bracing and spacing collar-like devices 3. The latter are preferably made of malleable iron, and, in casting, each is formed with the aforesaid holder pins or dowel pins 6, $6^a$, extending axially from the radial faces on one side and formed with the aforesaid sockets or recesses $6^b$ in the radial faces on the other side.

By having a large number of saw sections in each circle (eight are here present) and having each independently removable from the drum, it is made possible to substitute a small and relatively inexpensive part in case any of the teeth should become broken or a bend or warp should be formed in the saw metal. It is not necessary to dismantle the mechanism or remove bearings in order to take out the drum shaft, all that is requisite being to expose, for access (while the drum is in place), any saw section which requires removal, and to then loosen one of the clamp nuts slightly, enough to permit an eighth of an inch, or thereabouts, of looseness of the adjacent spacing collar. This permits sufficient axial movement of the parts to disengage the holder pins from the saw section that requires removal and replacing by another.

By having the projection $4^c$ at the front edge of the peripheral part of the saw section, and the corresponding inclined rear edge at $4^d$, provision is made for preventing the accumulation of lint fibers at the ends of the saw sections, as the front projections and rear inclined edges extend in approximately the same direction as the saw teeth, and therefore the Doffer brush filaments are adapted to clean out any lints that may be caught at these places, as readily as they are cleaned from the teeth.

I claim—

A toothed drum of the class described, having a central rotary holder, an axial series of axially movable ring-like spacing devices each having on each of its faces a circular series of radially positioned flat faced seats in axially stepped relation to each other, a circular series of lugs respectively projecting axially from the faces of said seats and a circular series of sockets on the opposite faces of the said spacer rings and respectively opposite to the said lugs, and a series of sets of peripherally short saw sections each provided with perforations to receive lugs such as aforesaid, and said sections being positioned in axially stepped relation to each other and independently held by said lugs against radial displacement.

In testimony whereof, I affix my signature.

JAMES C. GARNER.